(12) United States Patent
Ficara et al.

(10) Patent No.: US 12,526,739 B2
(45) Date of Patent: Jan. 13, 2026

(54) REDUCING POWER CONSUMPTION IN MESH NETWORKS

(71) Applicant: Cisco Technology, Inc., San Jose, CA (US)

(72) Inventors: Domenico Ficara, Essertines-sur-Yverdon (CH); Pascal Thubert, Roquefort les Pins (FR); Amine Choukir, Lausanne (CH); Alessandro Erta, Licciana Nardi (IT); Vincent Cuissard, Eteaux (FR); Salvatore Valenza, Pomy (CH); Stefano Ferrari, Le mont sur Lausanne (CH); Kasi Nalamalapu, Cupertino, CA (US); Loris Gazzarrini, Lausanne (CH); Arun Khanna, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 431 days.

(21) Appl. No.: 17/899,853

(22) Filed: Aug. 31, 2022

(65) Prior Publication Data
US 2024/0073810 A1 Feb. 29, 2024

(51) Int. Cl.
*H04W 52/02* (2009.01)
*H04W 4/02* (2018.01)

(52) U.S. Cl.
CPC ....... *H04W 52/0203* (2013.01); *H04W 4/027* (2013.01)

(58) Field of Classification Search
CPC ............. H04W 52/0203; H04W 4/027; H04W 52/0206

USPC ......................................... 370/310, 328, 338
See application file for complete search history.

(56) References Cited

U.S. PATENT DOCUMENTS

| | | | |
|---|---|---|---|
| 9,798,307 B2 | 10/2017 | Zhang et al. | |
| 10,412,094 B2 | 9/2019 | Anderson et al. | |
| 11,363,410 B2 | 6/2022 | Talluri et al. | |
| 2012/0100852 A1* | 4/2012 | Horn | H04W 36/0058 455/436 |
| 2013/0142136 A1* | 6/2013 | Pi | H04B 7/15507 370/329 |
| 2017/0111271 A1* | 4/2017 | Thubert | H04L 45/121 |
| 2017/0238258 A1* | 8/2017 | Ramalho de Oliveira | H04W 52/0261 455/574 |

(Continued)

OTHER PUBLICATIONS

Fimbombaya, et al., "Enhanced Magnetic Wireless Sensor Network Algorithm for Traffic Flow Monitoring in Low-Speed Congested Traffic", Journal of Electrical and Computer Engineering, vol. 2020, Article ID 5875398, Aug. 2020, 8 pages, Hindawi.

(Continued)

*Primary Examiner* — Obaidul Huq
(74) *Attorney, Agent, or Firm* — Lee & Hayes, P.C.

(57) ABSTRACT

In one embodiment, a device identifies a plurality of paths in a wireless backhaul network between a gateway and a plurality of access points that provide wireless connectivity to a mobile system. The device determines a movement of the mobile system. The device determines, based on the movement of the mobile system, that a particular path in the plurality of paths is not needed to provide wireless connectivity to the mobile system. The device causes one or more networking nodes along the particular path to enter into a power saving mode.

20 Claims, 8 Drawing Sheets

(56) References Cited

U.S. PATENT DOCUMENTS

| | | | |
|---|---|---|---|
| 2020/0205062 A1 | 6/2020 | Azizi et al. | |
| 2020/0383046 A1* | 12/2020 | Nayak | H04W 52/0245 |
| 2021/0061292 A1* | 3/2021 | Bae | G06F 8/65 |
| 2023/0217306 A1* | 7/2023 | Kim | H04W 76/19 |
| | | | 370/329 |
| 2024/0080724 A1* | 3/2024 | Wang | H04W 36/08 |

OTHER PUBLICATIONS

Mostofi, Shokouh, "On/Off Sleep Scheduling in Energy Efficient Vehicular Roadside Infrastructure", Thesis, Department of Electrical and Computer Engineering, Aug. 2013, 90 pages, McMaster University.

* cited by examiner

REDUCING POWER CONSUMPTION IN MESH NETWORKS

TECHNICAL FIELD

The present disclosure relates generally to computer networks, and, more particularly, to reducing power consumption in mesh networks.

BACKGROUND

Cellular network coverage has made Internet connectivity increasingly ubiquitous. This has led to an ever-increasing demand for bandwidth, to accommodate traffic such as multimedia content and communications (e.g., bandwidth-intensive high definition video streaming or real time video calls, etc.). For instance, passengers of public transportation now expect on-board, high-speed connectivity, which implies a reliable wireless ground-to-vehicle communication. Accordingly, wireless mesh networks are now being deployed, to provide connectivity to such fast-moving mobile systems.

While mesh networks can be quite capable of ensuring connectivity with fast-moving vehicles and other mobile systems, the reliability of these communications is also a function of the number of networking nodes in the mesh of the backhaul network. Indeed, networking nodes in the mesh must be located at physical locations that ensure both reliable connectivity with any mobile system, as well as between any access points and the gateway of the backhaul network. Consequently, the mesh network may include a relatively large number of networking nodes across a deployment. For instance, consider a mesh network that provides wireless connectivity along a train track that runs between two cities and spans many kilometers. In such a case, there may be many networking nodes in the mesh, each consuming power. In the aggregate, this power consumption can be quite substantial.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device identifies a plurality of paths in a wireless backhaul network between a gateway and a plurality of access points that provide wireless connectivity to a mobile system. The device determines a movement of the mobile system. The device determines, based on the movement of the mobile system, that a particular path in the plurality of paths is not needed to provide wireless connectivity to the mobile system. The device causes one or more networking nodes along the particular path to enter into a power saving mode.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
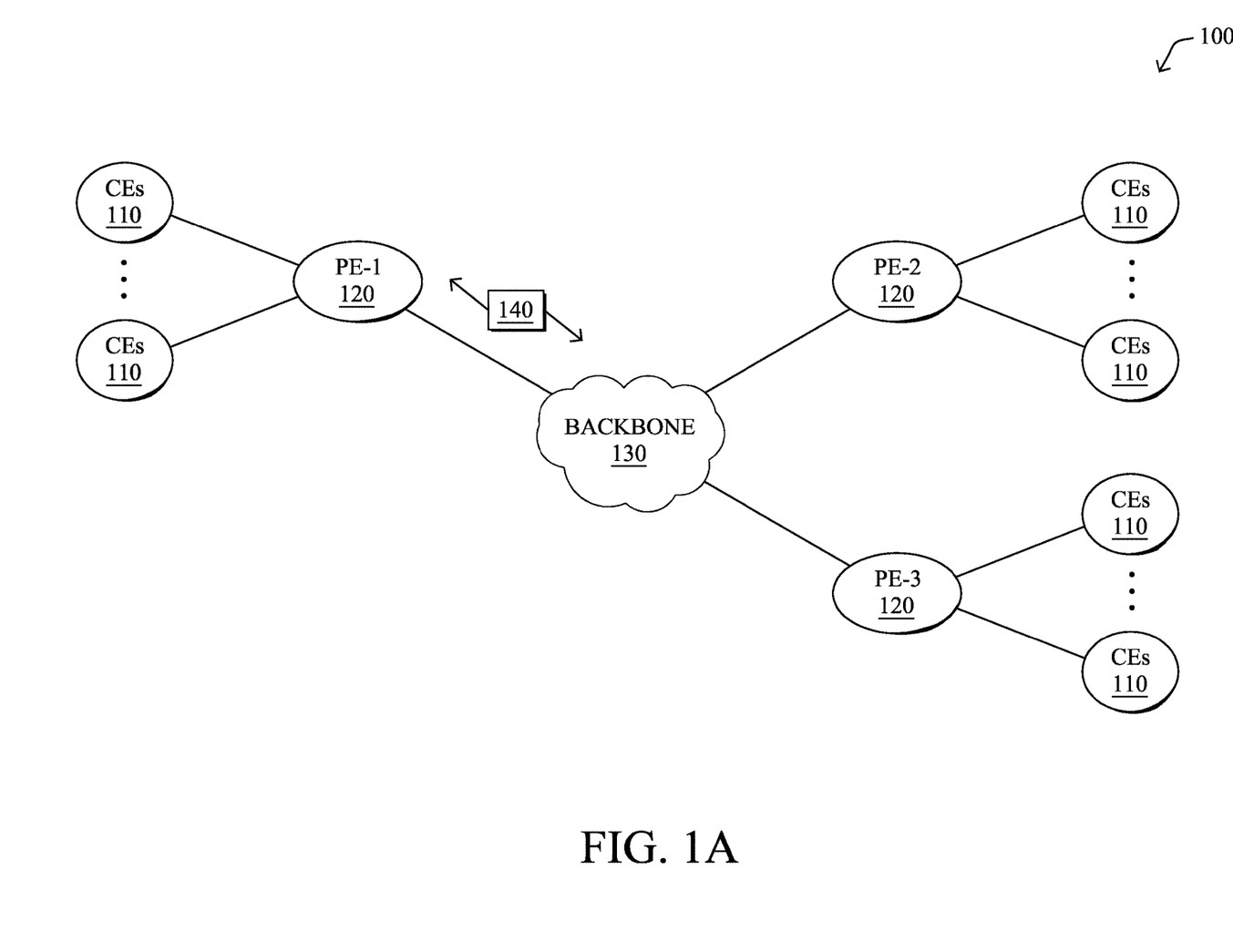
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
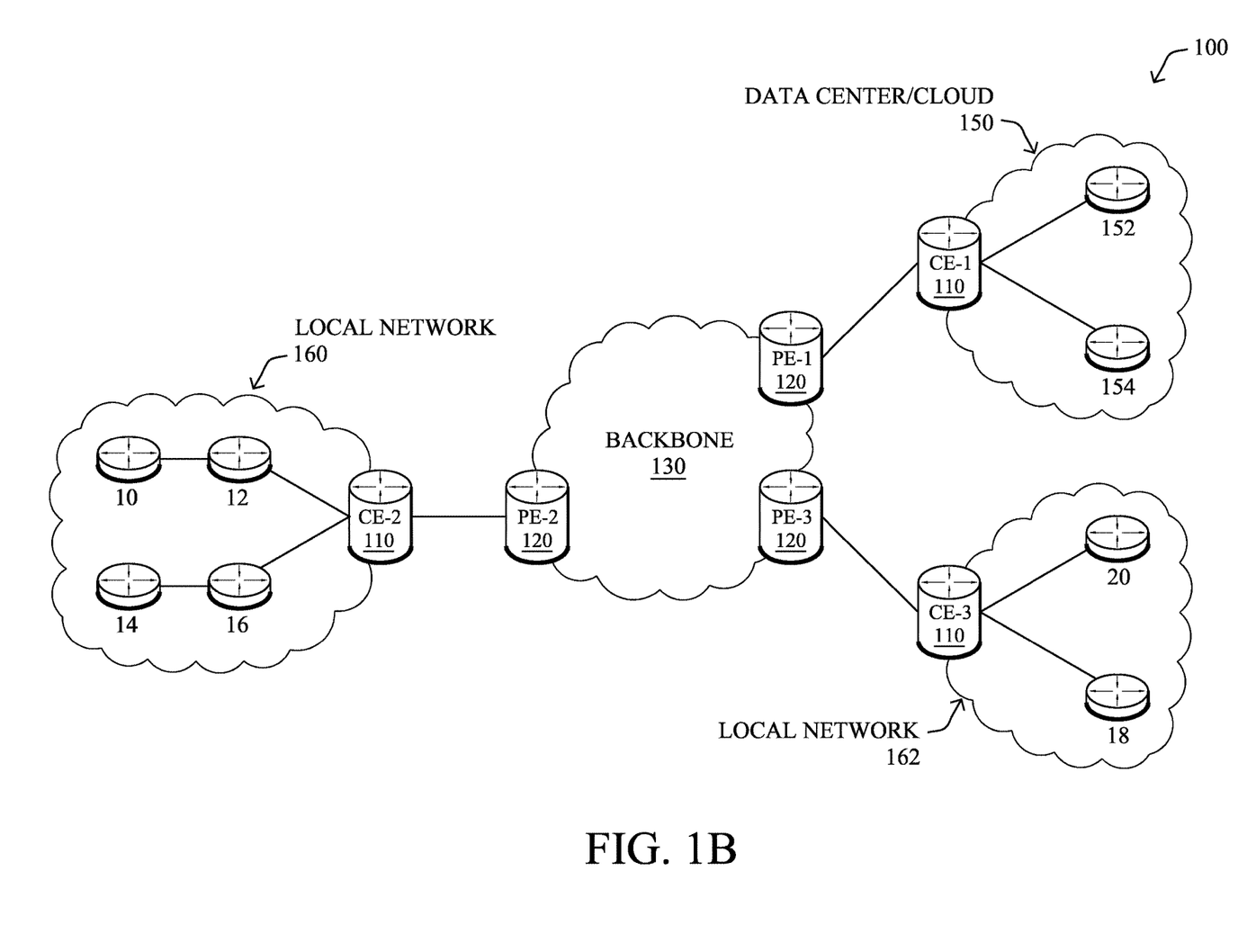

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
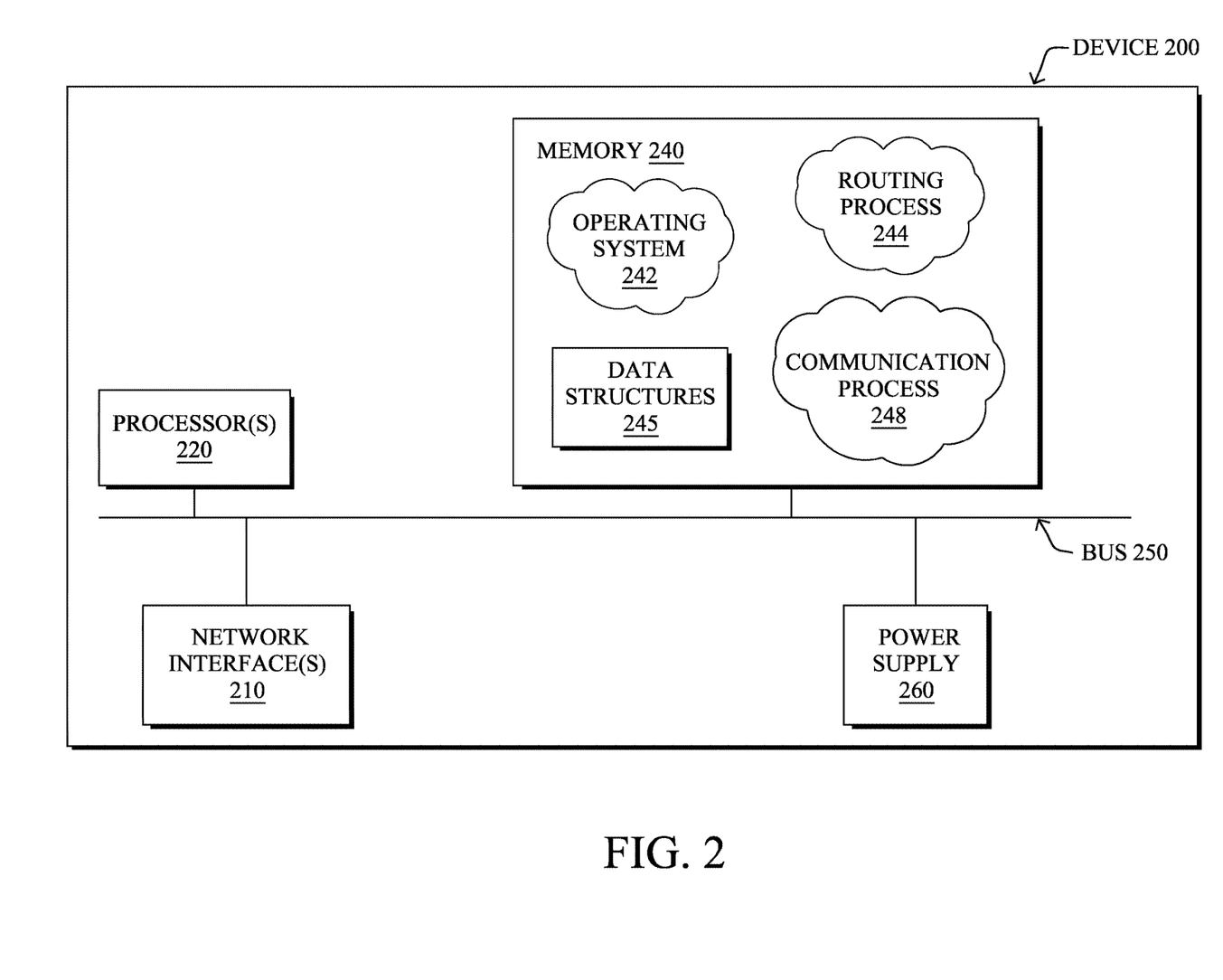
FIG. 2 illustrates an example network device/node.

FIG. 2 is a schematic block diagram of an example node/device 200 that may be used with one or more embodiments described herein. As shown, device 200 may comprise one or more communication interfaces 210 (e.g., wired, wireless, etc.), at least one processor 220, and a memory 240 interconnected/coupled by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, Ethernet, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a routing process 244 and/or a communication process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In general, communication process 248 includes instructions executable by processor 220 to perform functions related to a mobile system roaming from one wireless access point to another. To this end, communication process 248 may operate in conjunction with routing process 244, in some instances, to establish and maintain one or more LSPs between a mobile system and the backend infrastructure. An example protocol that uses label-switched paths is the Multiprotocol Label Switching (MPLS) protocol. In general, MPLS operates by appending an MPLS header to a packet that includes a label 'stack.' The label(s) in the stack are inserted by a label edge router (LER) based on the forwarding equivalence class (FEC) of the packet. Paths are also managed via the Label Distribution Protocol (LDP) or Resource Reservation Protocol-Traffic Engineering (RSVP-TE). Another protocol that communication process 248 may utilize is the Control and Provisioning of Wireless Access Points (CAPWAP) protocol.

Figure 3:
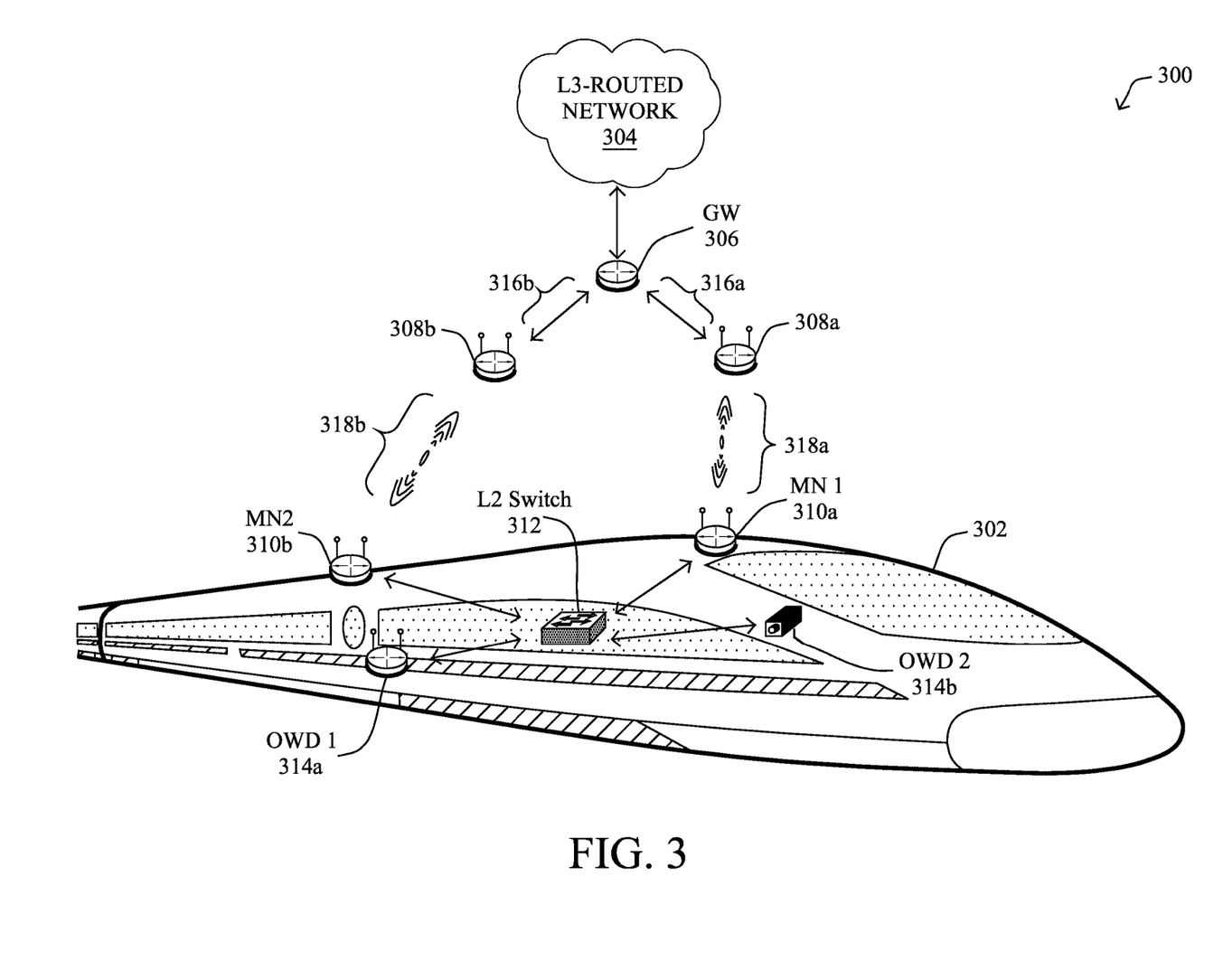
FIG. 3 illustrates an example of a mobile system communicating wirelessly.

FIG. 3 illustrates an example 300 of a mobile system communicating wirelessly, according to various embodiments. As shown, the mobile system 302 may generally take the form of any mobile object or set of objects equipped with its own internal network and configured to communicate wirelessly with a backhauling system during motion. For instance, mobile system 302 may take the form of a train, bus, airplane or other flying vehicle, ferry, automobile, mine cart, crane, truck, another form of vehicle that may be used for transportation or shipping, a vehicle that may be found in a worksite, mining location, industrial site, factory, etc., a robot, or the like. In further cases, mobile system 302 may be a fully-autonomous, or partially-autonomous, vehicle or other system that moves with little or no direct human control.

Onboard mobile system 302 may be various networking devices that support the mobile domain of mobile system 302. In some embodiments, as shown, there may be a Layer-2 (L2) switch 312 onboard mobile system 302 that is connected to any number of onboard devices 314 within the mobile domain of mobile system 302. For instance, onboard device 314a may take the form of an onboard Wi-Fi access point that provides connectivity to any number of user devices (e.g., mobile phones, computers, etc.) of passengers being transported by mobile system 302. Conversely, onboard device 314b may take the form of a security camera that is also connected to L2 switch 312. In various embodiments, some or all of the onboard devices 314 may be onboard wired devices (OWDs), meaning that they communicate with L2 switch 312 via wired connections, such as an Ethernet network or the like.

According to various embodiments, the mobile domain of mobile system 302 may also include a plurality of mobile nodes 310, denoted "MN" in the Figures for simplicity. For instance, as shown, mobile system 302 may include a first mobile node 310a and a second mobile node 310b. Each mobile node 310 may generally include: 1.) a wireless interface to exchange data with wireless access points of the backhaul network and 2.) a local interface to exchange data with the local network of mobile system 302. For instance, mobile node 310a and mobile node 310b may each have a wired connection to L2 switch 312.

As would be appreciated, mobile node 310a and mobile node 310b may be located on mobile system 302 at a distance from one another, so as to provide spatial diversity to the potential wireless connection points utilized by mobile system 302. For example, mobile node 310a may be located near the front of mobile system 302 (e.g., the head-end of a train), while mobile node 310b may be located farther towards the rear of mobile system 302 than that of mobile node 310a. Thus, even if a particular mobile node 310 does not have a reliable wireless connection to the backhaul system, another mobile node 310 of mobile system 302 may (e.g., if the train is going around a curve in the track, etc.). In some instances, mobile nodes 310 may also offer frequency diversity, as well, such as by operating on different frequencies, at least part of the time. As a result, even if one frequency is experiencing interference, the other frequency could be used to form a wireless connection between mobile system 302 and the backhaul system.

Located along the path of travel of mobile system 302 (e.g., a railroad track, a road, a waterway, a runway, etc.) may be any number of wireless base stations/access points 308. For instance, as shown, there may be trackside access points 308a-308b shown. Note that while these wireless access points are referred to herein as 'trackside,' their locations can be varied depending on the deployment scenario (e.g., roadside, etc.).

During operation, access points 308a-308b may form wireless connections with mobile node 310a and/or mobile node 310b, to provide wireless connectivity to mobile system 302 as it travels. To this end, each access point 308 may include at least 1.) a wireless interface to communicate with a mobile node 310 and 2.) an interface to communicate with a gateway 306, denoted "GW" for simplicity. Typically, the connections between access points 308a-308b and gateway

306 are wired connections that use a suitable wired communication protocol, such as Ethernet.

Gateway 306 represents the other end of the backhauling system and provides Layer-3 (L3) routing functions. To do so, gateway 306 may include at least one interface connected to L3-routed network 304, as well as any number of interfaces to communicate with access points 308. For instance, L3-routed network 304 may take the form of the Internet, in many instances, although the techniques herein may be extended to any number of different types of external networks, as desired.

Traditionally, a backhaul system supporting mobile domains/systems relies on the use of multiple tunnels, to convey traffic between the L3 gateway and the mobile domain/system. For instance, as shown, assume that mobile node 310*a* has formed a wireless connection 318*a* with access point 308*a*. Such a connection may be formed using a suitable transmission protocol, such as the Prodigy protocol by Fluidmesh (now Cisco Systems) or another wireless protocol that supports extremely fast handoffs. Consequently, mobile node 310*a* may establish a first tunnel over wireless connection 318*a*. gateway 306 and access point 308*a* may form a second tunnel via their connection 316*a*, likewise. Thus, when access point 308*a* sends traffic that it receives from mobile node 310*a* towards gateway 306, it may encapsulate the traffic and tunneled via the first tunnel, which access point 308*a* then encapsulates for transport via the second tunnel to gateway 306. A similar approach may be taken with respect to wireless connection 318*b* between mobile node 310*b* and access point 308*b*, as well as connection 316*b* between access point 308*b* and gateway 306.

In alternative embodiments, a single L2 tunnel may be established between each access point 308 and gateway 306. This tunnel will carry L2 traffic between gateway 306 and the mobile node 310 to which the access point 308 is connected. For instance, a first L2 tunnel may be formed between gateway 306 and access point 308*a* over which traffic conveyed between access point 308*a* and mobile node 310*a* may be transported, assuming that wireless connection 318*a* exists. Similarly, another gateway 306 and access point 308*b* may form a second L2 tunnel over which traffic conveyed between access point 308*b* and mobile node 310*b* may be transported, assuming that wireless connection 318*a* exists.

Typically, only a single wireless link is active at any given time between a mobile system, such as mobile system 302, and any given access point 308. For instance, assume that mobile node 310*a* is wirelessly connected to access point 308*a*. In such a case, any other mobile node 310 on mobile system 302 (e.g., mobile node 310*b*, etc.) may be in an idle state at that time. In other words, one of the mobile nodes (e.g., mobile node 310*a*) may be designated as the primary, while the other is designated as the secondary (e.g., mobile node 310*b*) and remains idle. As mobile system 302 roams, the primary node may begin passing its traffic to the secondary node, to begin leveraging its own connection to the fixed infrastructure. In turn, the roles of the two nodes may be switched, thereby making mobile node 310*a* the secondary node and mobile node 310*b* the primary node.

As noted above, backhaul connectivity in many wireless mesh networks in fixed deployments for fast-moving clients/nodes rely on some form of tunneling, such as through the use of MPLS, CAPWAP, EoGRE, or the like. In many of these cases, tunneling is hierarchical in that tunnels are carried within tunnels, in order to preserve segmentation across different domains and abstract network characteristics. To do so, a packet may be encapsulated any number of times with different tunnel headers, during its transit to its destination (e.g., the network gateway, etc.).

One of the challenges with respect to such a mesh-based backhaul network is its relative size. Indeed, consider the case of a backhaul network that provides wireless connectivity to trains traversing a railway. In such a case, the nodes/devices of the mesh may be quite numerous and be distributed across any number of kilometers.

An observation herein is that many of the networking nodes/devices in the mesh are not actually needed to support communications with the mobile system(s), at any given time. For instance, consider again a mesh that provides connectivity to trains moving along a railway between two cities. If the trains only run every half hour, only the networking nodes along the path(s) that connect the train to the gateway actually need to be fully powered, meaning that there is an opportunity to reduce power consumption in the mesh by having the unused/unneeded nodes enter into a power savings mode.

Reducing Power Consumption in Mesh Networks

The techniques herein introduce a power savings mechanism that is able to conserve power usage in mesh networks, particularly for those that provide network access to fast moving mobile systems.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein, potentially in conjunction with routing process 244.

Specifically, in various embodiments, a device identifies a plurality of paths in a wireless backhaul network between a gateway and a plurality of access points that provide wireless connectivity to a mobile system. The device determines a movement of the mobile system. The device determines, based on the movement of the mobile system, that a particular path in the plurality of paths is not needed to provide wireless connectivity to the mobile system. The device causes one or more networking nodes along the particular path to enter into a power saving mode.

Figure 4A:
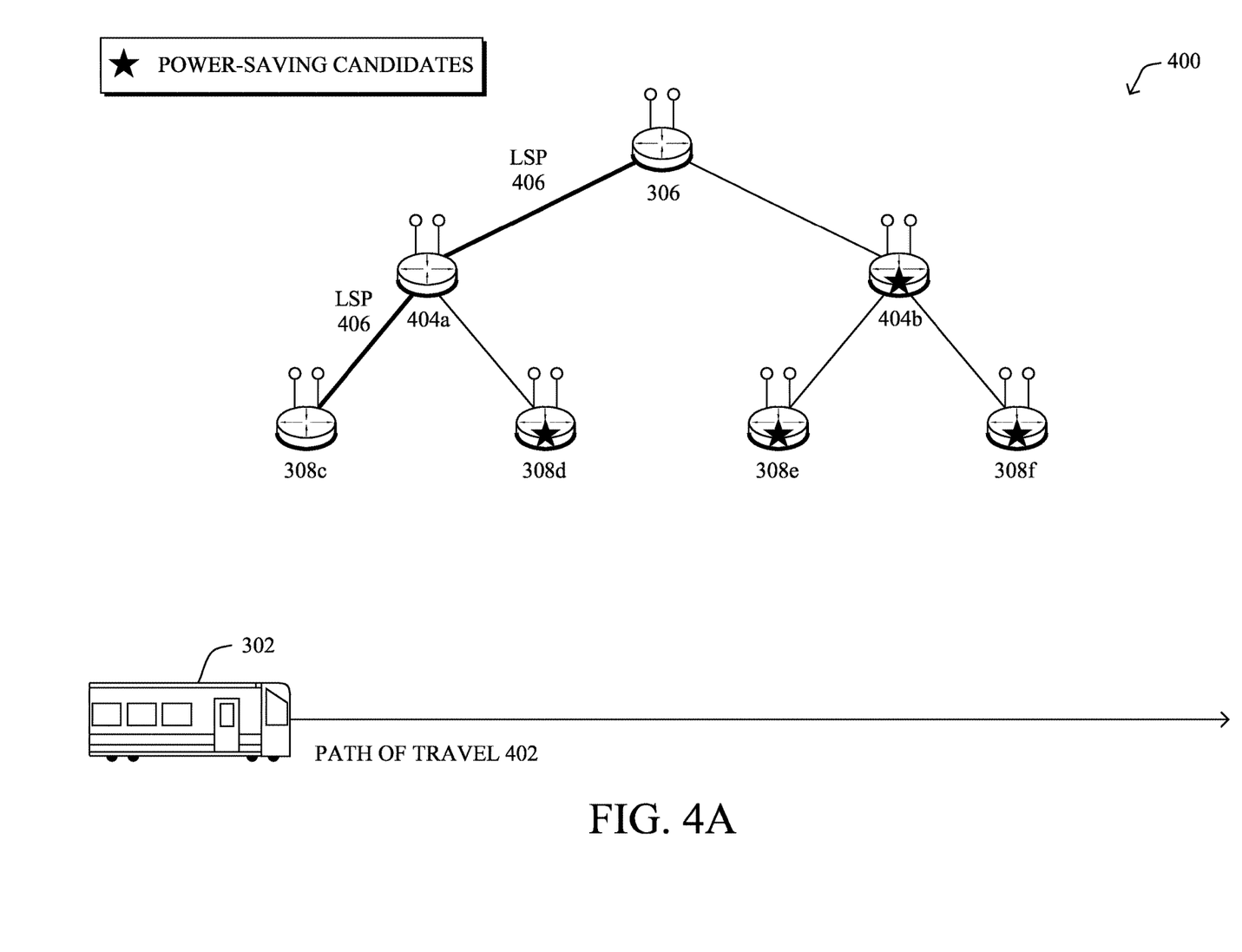
FIGS. 4A-4C illustrate an example of dynamic power saving across a wireless backhaul mesh network.
Figure 4B:
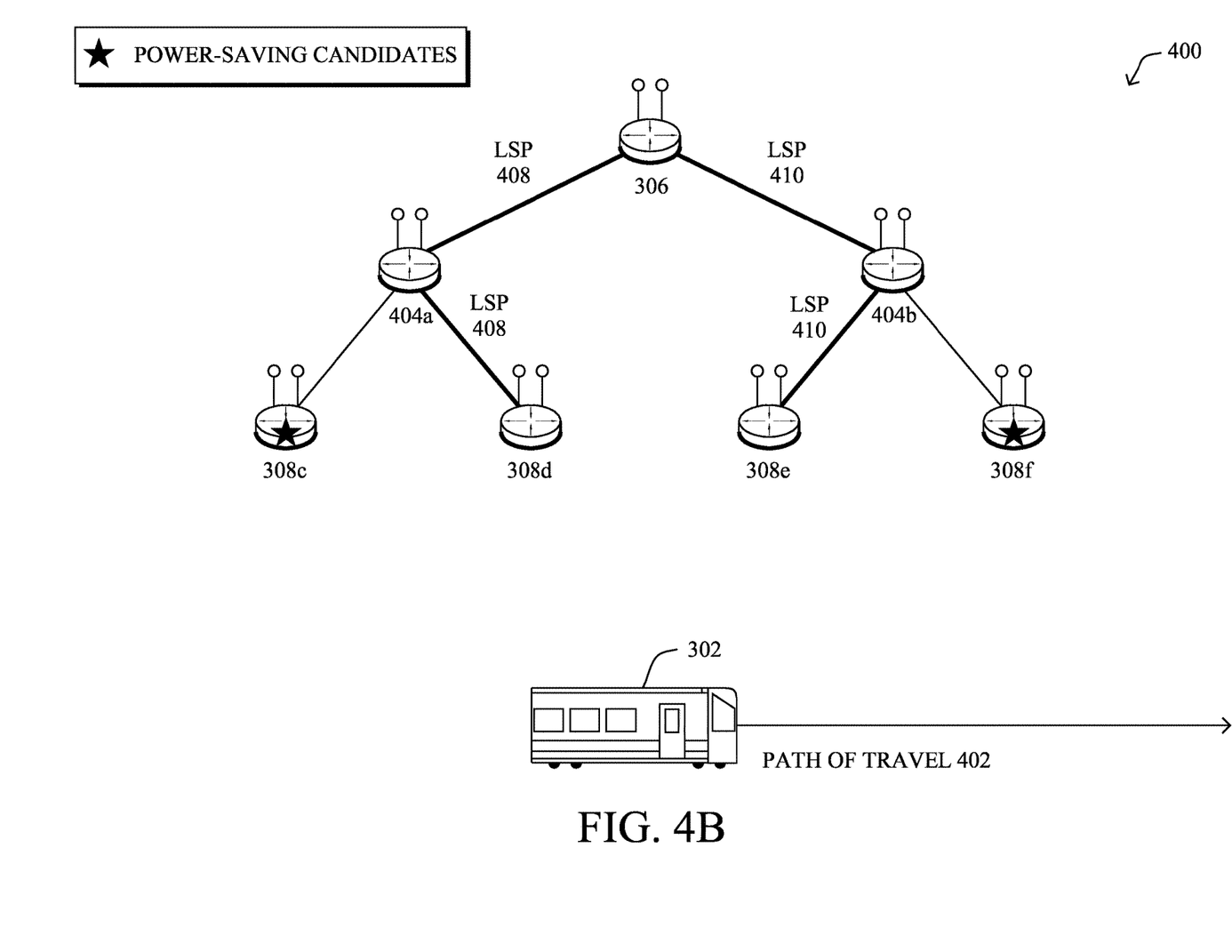
Figure 4C:
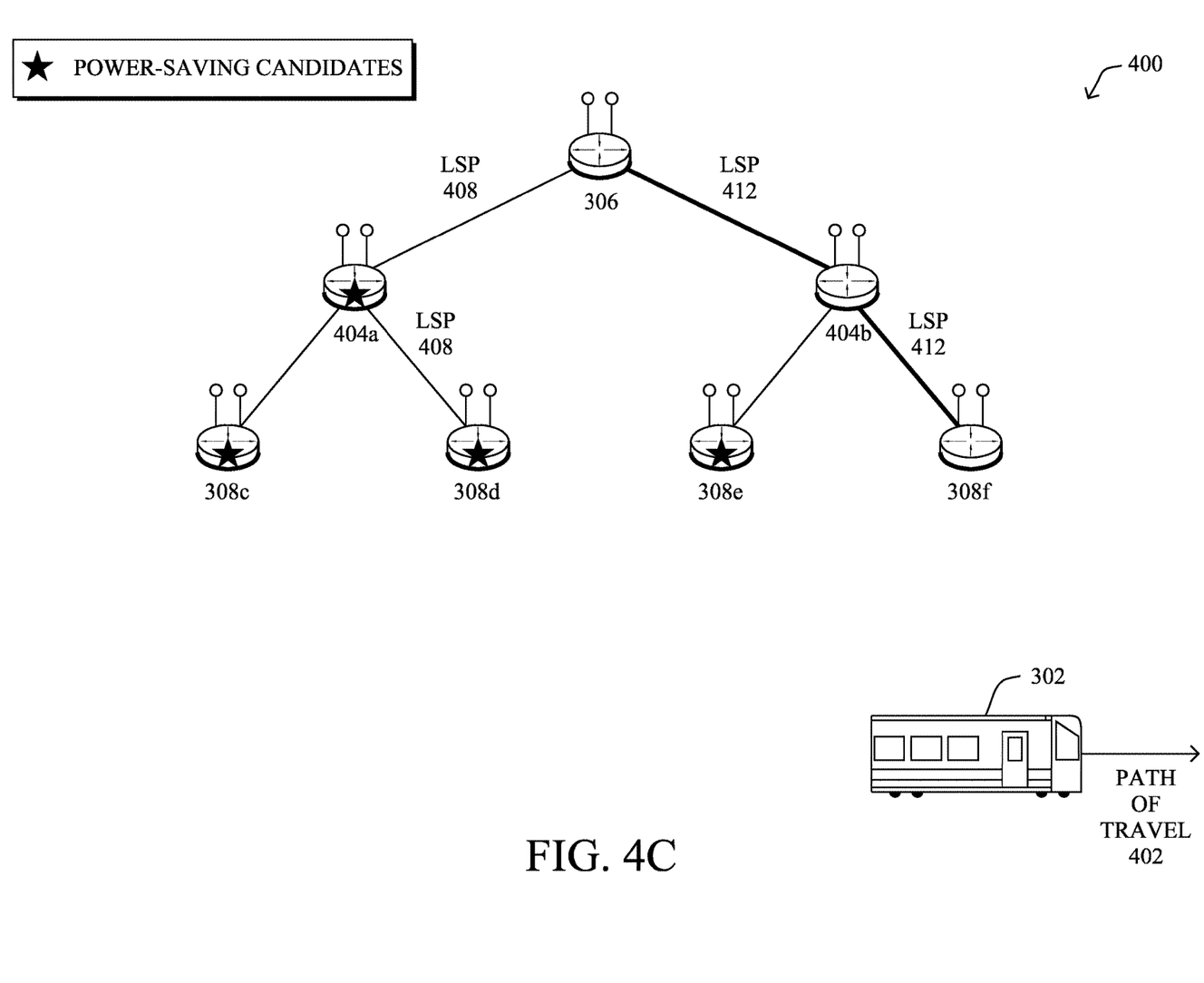

Operationally, the techniques herein leverage the fact that only a portion of the backhaul mesh providing connectivity to fast moving mobile systems is active at any given point in time. For instance, FIGS. 4A-4C illustrate an example of dynamic power saving across a wireless backhaul mesh network. As shown, consider the case of mobile system 302 moving along a path of travel 402, such as a railway, roadway, runway, etc. Of course, in some embodiments, mobile system 302 may also take the form of an autonomous robot, such as an unmanned aerial vehicle (UAV), warehouse robot, or the like.

As would be appreciated, backhaul mesh network 400 may be hierarchical in nature, with any number of intermediary relay nodes connecting base stations/access points 308 to gateway 306. For instance, as shown, there may be intermediate nodes 404 that are configured to relay traffic between access points 308 and gateway 306. In addition, while three layers are shown, there may be more or fewer layers in other mesh hierarchies, without deviating from the techniques herein.

Based on the current location of mobile system 302, only a portion of the paths between gateway 306 and access points 308 is actually needed to provide wireless connectivity to mobile system 302. For instance, as shown in FIG. 4A, only LSP 406 in backhaul mesh network 400 may currently be needed to provide connectivity to mobile system 302 at this time. Accordingly, only access point 308c and intermediate node 404a along LSP 406 actually need to be fully powered at this time. This means that the other nodes in the mesh, such as access points 308d-308f and intermediate node 404b are potential candidates to enact power-saving measures.

Since all tunnel paths are well-known and precomputed in such a mesh network, it becomes possible to identify which networking nodes in the mesh are needed at any given time to provide connectivity to mobile system 302 and those that are candidates to conserve power. In various embodiments, a networking node may enter into a power saving mode that takes any of the following forms:

- A mode that powers down only a fraction of the node, such as its radio transceiver and/or other portions of its hardware.
- A 'deep sleep' mode whereby the node is either entirely powered down or close to being fully powered down.
- Etc.

Thus, the techniques herein may be used to select, for any point in time, any or all of the following parameters:

- Which networking node(s) are to enter into a power saving mode
- The type of power saving mode a given node is to enter
- The time duration for the power saving mode
- Any conditions that may cause the node to wake from its power saving mode prematurely
- Etc.

According to various embodiments, the selection of which node(s) are to enter into a power saving mode may be made based on the movement of mobile system 302 and/or any other mobile systems supported by backhaul mesh network 400. This can be achieved in a number of ways, with the control residing either onboard mobile system 302, in backhaul mesh network 400 itself (e.g., on gateway 306, an intermediate node 404, an access point 308, etc.), or even external to backhaul mesh network 400, such as on a server.

In one embodiment, a predictive approach may be taken with respect to the movement of the mobile system(s) that rely on backhaul mesh network 400 for wireless connectivity. For instance, the system may predict a future location and/or direction of travel of mobile system 302 based on its current location, velocity, path of travel 402, acceleration, a history of its movements, or the like. Note that such a prediction becomes relatively trivial in the case of a fixed path of travel 402, such as a railway, roadway, etc., especially in the case in which mobile system 302 moves periodically. For instance, in the case of a train, mobile system 302 may periodically pass a given access point 308 within an expected range of time.

In some instances, machine learning could also be leveraged, to predict the movements of mobile system 302 and, by extension, the path(s) and networking nodes in backhaul mesh network 400 needed at any given time to provide wireless connectivity to mobile system 302. Here, the general idea is to predict the movement and probable position of mobile system 302 in the next T-number of seconds and predict the tunnel layout needed in backhaul mesh network 400.

In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Example machine learning techniques that could be used to predict the movements of mobile system 302 may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Of course, it may also be the case that the optimal solution is such that the traffic for mobile system 302 and/or any other mobile system supported by the network needs to be supported by all of the various paths and networking nodes. Indeed, a longer path for certain traffic flows may be acceptable, so as to avoid high loads or application performance degradation. In such a case, the controlling device may decide to simply not cause any of the networking nodes to enter into a power savings mode at the time.

In a further embodiment, the device that causes the networking nodes to enter into a power saving mode may be onboard mobile system 302. In such a case, the device may determine the movement of mobile system 302 using any of the above approaches or, in some embodiments, based on the wireless handoffs performed between mobile system 302 and access points 308 of backhaul mesh network 400 and/or the signals therebetween (e.g., the RSSI, etc.). For instance, as mobile system 302 moves closer to access point 308d, it may send a communication to its prior access point 308c (either directly or indirectly, such as via access point 308d), indicating to it that it can now enter into a power saving mode, as mobile system 302 no longer requires it or connectivity.

As would be appreciated, the set of networking nodes that may be placed into a power saving mode will also change over time. For instance, in FIG. 4B, as mobile system 302 continues along its path of travel 402, access point 308c may no longer be needed and could be placed into a power saving mode. Similarly, as mobile system 302 is now located between access points 308d-308e, the corresponding LSPs 408-410 may be deemed needed to support communications with mobile system 302. Thus, the set of candidate nodes in backhaul mesh network 400 for power saving has changed to include only access point 308c and access point 308f, at this point in time.

As mobile system 302 further continues along its path of travel 402, as shown in FIG. 4C, only LSP 412 needs to be active at this time, meaning that intermediate node 404*a* and access points 308*c*-308*e* can be placed into a power saving mode.

In some embodiments, a networking node placed into a power saving state may also be configured to periodically wake up from that state. For instance, any of intermediate nodes 404 or access points 308 may be configured with a policy to wake up (i.e., exit is power saving mode) every N-number of seconds and check whether anything is needed to be done by them. If not, the node may return back to its power saving mode. In this approach, the sampling could also be adaptive, such as by having the wakeup frequency increase as mobile system 302 approaches and less frequently, otherwise. This approach can be quite useful if the nodes have other bookkeeping activities or other services to provide, apart from backhauling traffic.

In a variation of the above intuition of various levels of sampling (that eventually translate into various levels of power usage), this concept can also be extended to introduce the concept of a "wake-up distance" for each node. More specifically, given the location of mobile system 302, each node in backhaul mesh network 400 may have a wake-up distance from mobile system 302 that can be defined as the time difference between the current time and the most likely moment at which the node will need to wake up again, as mobile system 302 continues to move. For a trackside access point 308, for instance, the wake-up distance may decrease as mobile system 302 approaches and reaches a maximum again as soon as the train crosses the access point and leaves it behind.

As mentioned above, powering up or down a trackside access point 308 implicitly means the same operation can also be applied on the intermediate node(s) 404 that carry the tunnel to gateway 306 for that access point 308. Therefore, the wake-up distance for these nodes is the minimum among all the trackside access points 308 whose traffic they serve. The distance is important because trackside access points 308 close to mobile system 302 need to monitor the spectrum and radio parameters in order to be able to support predictive algorithms and provide backups.

In some embodiments, the wake-up distance could also be used to select the power saving mode used by a given networking node at any given time. For instance, a large wake-up distance could mean that the node can really enter into a hibernation state and use little to no power. Conversely, a small wake-up distance may mean that the node is almost ready to become fully awake, so it may enter into a power saving mode that only shuts down its radio. A middle approach could also be employed, such as by shutting down multiple other hardware systems of the node, without being in full sleep/hibernation mode, as when the wake-up distance is at a maximum.

In another embodiment, a control loop could also be implemented, to adjust the use of power saving modes in backhaul mesh network 400 over time. For instance, information for each networking node may be collected regarding its power usage, time to wake up, amount of passed traffic, and/or radio parameters measurements, for each power-up event. These statistics may be correlated with historical radio resource management (RRM) data collected on the same and nearby nodes and optimization algorithms (e.g., using machine learning) may provide suggestions for the next time mobile system 302 is going through the same location such as:

What components to power-up
When to power it up and down
What amount of power to use on its radio
What channels to use, which may be used particularly in cases in which multiple channels are used.

In further embodiments, deterministic or semi-deterministic approaches could also be leveraged. For instance, in cases in which mobile system 302 moves according to a set schedule, the wake-up schedules for each networking node may be set deterministically so as to provide connectivity to mobile system 302 when it needs it. Of course, mobile system 302 may also experience delays in its movement for various reasons (e.g., weather, obstructions, emergencies, etc.), in which an offset could also be applied to the deterministic schedule to account for the delay.

Figure 5:
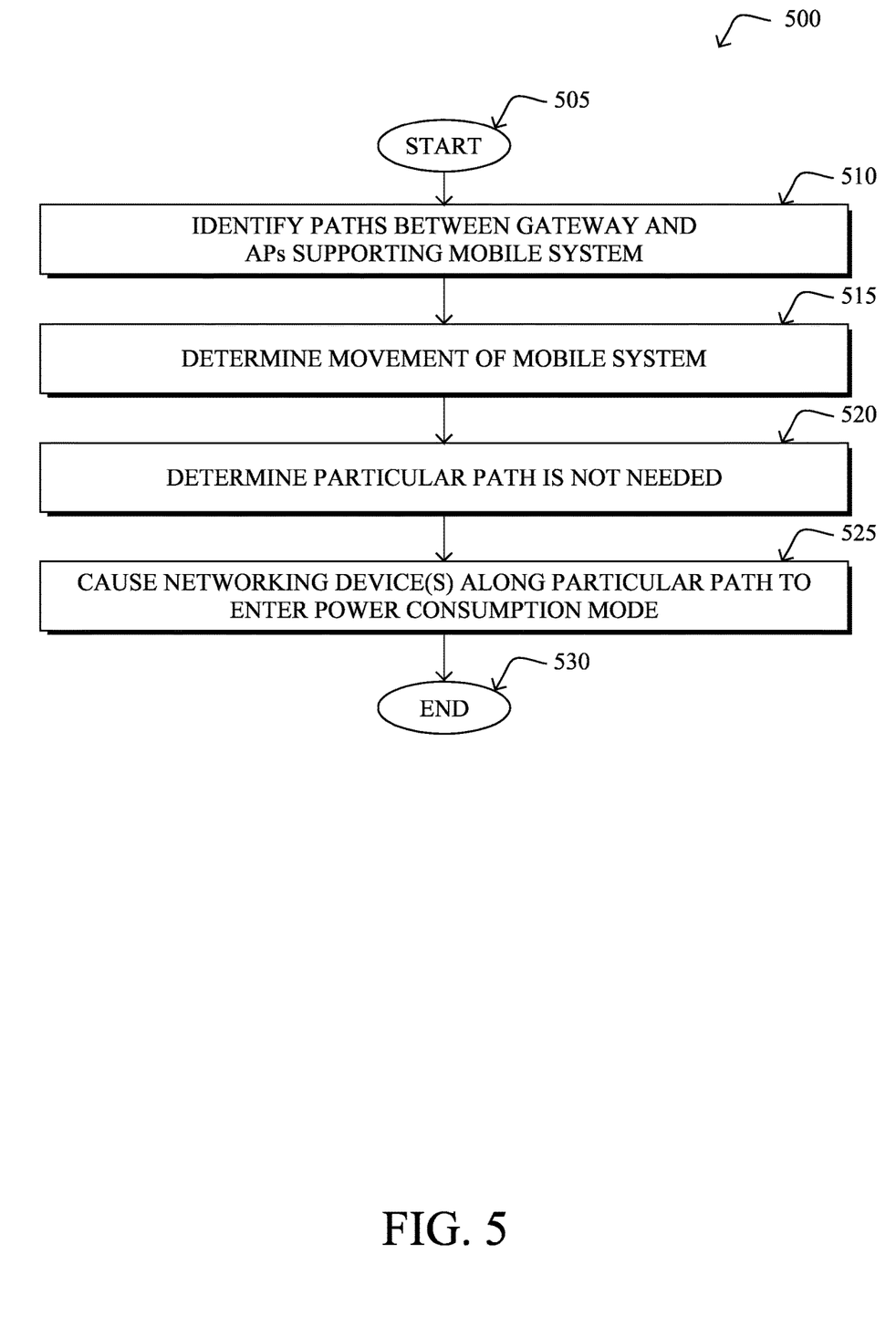
FIG. 5 illustrates an example simplified procedure for reducing power consumption in mesh networks.

FIG. 5 illustrates an example simplified procedure (e.g., a method) for reducing power consumption in mesh networks, in accordance with one or more embodiments described herein. For example, a non-generic, specifically configured device/apparatus (e.g., device 200) may perform procedure 500 by executing stored instructions (e.g., communication process 248 and/or routing process 244). Procedure 500 may start at step 505 and continues on to step 510 where, as described in greater detail above, the device may identify a plurality of paths in a wireless backhaul network between a gateway and a plurality of access points that provide wireless connectivity to a mobile system. In some embodiments, the mobile system travels along a fixed path, such as a roadway, railway, runway, etc. In further embodiments, the mobile system comprises a vehicle or autonomous robot.

At step 515, as detailed above, the device may determine a movement of the mobile system. In some embodiments, the device may do so by predicting a future location or direction of movement of the mobile system. In other embodiments, such as when the device is onboard the mobile system, the device may do so based on the mobile system moving away from its current access point, its coordinates, or the like.

At step 520, the device may determine, based on the movement of the mobile system, that a particular path in the plurality of paths is not needed to provide wireless connectivity to the mobile system, as described in greater detail above. In some embodiments, the device is onboard the mobile system and determines that the particular path is not needed based on the mobile system performing a wireless handoff away from an access point of the particular path (e.g., that the mobile system is moving away from the access point of the particular path). In some embodiments, the device may also determine that no networking nodes in the wireless backhaul network should be in a power saving mode at a particular point in time (e.g., based on the movements of multiple mobile stations, current network conditions, etc.).

At step 525, as detailed above, the device may cause one or more networking nodes along the particular path to enter into a power saving mode. In some embodiments, the one or more networking nodes comprises a particular one of the plurality of access points (e.g., the access point along the particular path). In a further embodiment, the one or more networking nodes further comprises at least one relay node along the particular path. In some embodiments, the one or more networking nodes are configured to periodically leave the power saving mode to test whether there are any wireless communications being sent to them. In one embodiment, such as when the device is onboard the mobile system, the device may cause the node(s) to enter into a power saving mode by sending a communication to the access point of the particular path that causes it to enter into a power saving mode. In more centralized embodiments, such a communication could also be sent by a centralized service, networking node (e.g., the gateway, etc.), or the like. In some embodiments, the power saving mode is selected from among a plurality of power saving modes based on an expected time at which an access point of the particular path will need to provide wireless connectivity to another mobile system. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for enhanced power savings in mesh networks, it is to be understood that various other adaptations and modifications may be made within the spirit and scope of the embodiments herein. For example, while certain embodiments are described herein with respect to using certain wired and/or wireless protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/ RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
    identifying, by a device, a plurality of network paths in a wireless backhaul network between a gateway and a plurality of access points that provide wireless connectivity to a mobile system moving along a physical path;
    determining, by the device, that the mobile system disassociates from a particular access point of a particular network path in the plurality of network paths and associates with a different access point of a different network path in the plurality of network paths;
    determining, by the device and based on the mobile system disassociating from the particular access point, that the particular network path is no longer needed to provide wireless connectivity to the mobile system due to movement of the mobile system along the physical path; and
    causing, by the device and in response to determining that the particular network path is no longer needed to provide wireless connectivity to the mobile system, one or more networking nodes along the particular network path to enter into a power saving mode.

2. The method as in claim 1, wherein the one or more networking nodes comprises the particular access point.

3. The method as in claim 2, wherein the one or more networking nodes further comprises at least one relay node along the particular network path.

4. The method as in claim 1, wherein the one or more networking nodes are configured to periodically leave the power saving mode to test whether there are any wireless communications being sent to them.

5. The method as in claim 1, wherein the device is onboard the mobile system.

6. The method as in claim 5, wherein causing the one or more networking nodes along the particular network path to enter into a power saving mode comprises:
    sending, by the device, a communication to the particular access point that causes it to enter into a power saving mode.

7. The method as in claim 1, further comprising:
    predicting, by the device, the physical path based on a future location or direction of movement of the mobile system.

8. The method as in claim 1, wherein the power saving mode is selected from among a plurality of power saving modes based on an expected time at which the particular access point of the particular network path will need to provide wireless connectivity to another mobile system.

9. The method as in claim 1, wherein the mobile system travels along a fixed physical path.

10. The method as in claim 1, wherein the mobile system comprises a vehicle or autonomous robot.

11. An apparatus, comprising:
    one or more network interfaces;
    a processor coupled to the one or more network interfaces and configured to execute one or more processes; and
    a memory configured to store a process that is executable by the processor, the process when executed configured to:
        identify a plurality of network paths in a wireless backhaul network between a gateway and a plurality of access points that provide wireless connectivity to a mobile system moving along a physical path;
        determine that the mobile system disassociates from a particular access point of a particular network path in the plurality of network paths and associates with a different access point of a different network path in the plurality of network paths;
        determine, based on the mobile system disassociating from the particular access point, that the particular network path is no longer needed to provide wireless connectivity to the mobile system due to movement of the mobile system along the physical path; and
        cause, in response to determining that the particular network path is no longer needed to provide wireless connectivity to the mobile system, one or more networking nodes along the particular network path to enter into a power saving mode.

12. The apparatus as in claim 11, wherein the one or more networking nodes comprises the particular access point.

13. The apparatus as in claim 12, wherein the one or more networking nodes further comprises at least one relay node along the particular network path.

14. The apparatus as in claim 11, wherein the one or more networking nodes are configured to periodically leave the power saving mode to test whether there are any wireless communications being sent to them.

15. The apparatus as in claim 11, wherein the apparatus is onboard the mobile system.

16. The apparatus as in claim 15, wherein the apparatus causes the one or more networking nodes along the particular network path to enter into a power saving mode by:
    sending a communication to the particular access point that causes it to enter into a power saving mode.

17. The apparatus as in claim 11, wherein the process when executed is configured to:

predict the physical path based on a future location or direction of movement of the mobile system.

18. The apparatus as in claim 11, wherein the power saving mode is selected from among a plurality of power saving modes based on an expected time at which the particular access point of the particular network path will need to provide wireless connectivity to another mobile system.

19. The apparatus as in claim 11, wherein the process when executed is further configured to:
    determine that no networking nodes in the wireless backhaul network should be in a power saving mode at a particular point in time.

20. A tangible, non-transitory, computer-readable medium storing program instructions that cause a device to execute a process comprising:
    identifying, by the device, a plurality of network paths in a wireless backhaul network between a gateway and a plurality of access points that provide wireless connectivity to a mobile system moving along a physical path;
    determining, by the device, that the mobile system disassociates from a particular access point of a particular network path in the plurality of network paths and associates with a different access point of a different network path in the plurality of network paths;
    determining, by the device and based on the mobile system disassociating from the particular access point, that the particular network path is no longer needed to provide wireless connectivity to the mobile system due to movement of the mobile system along the physical path; and
    causing, by the device and in response to determining that the particular network path is no longer needed to provide wireless connectivity to the mobile system, one or more networking nodes along the particular network path to enter into a power saving mode.

* * * * *